(12) United States Patent
Jeon

(10) Patent No.: US 7,136,864 B2
(45) Date of Patent: Nov. 14, 2006

(54) DATABASE TABLE MODELING AND EVENT HANDLING METHOD FOR REAL TIME ALARM MANAGEMENT

(75) Inventor: Eung-Sun Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 10/754,059

(22) Filed: Jan. 9, 2004

(65) Prior Publication Data

US 2004/0162810 A1 Aug. 19, 2004

(30) Foreign Application Priority Data

Feb. 14, 2003 (KR) ...................... 10-2003-0009519

(51) Int. Cl.
*G06F 17/30* (2006.01)
(52) U.S. Cl. ...................................... 707/101; 707/102
(58) Field of Classification Search ................ 707/101, 707/102, 200, 201, 104.1, 100; 709/215, 709/200, 224; 714/48
See application file for complete search history.

(56) References Cited

U.S. PATENT DOCUMENTS

| | | | | |
|---|---|---|---|---|
| 6,064,304 A | 5/2000 | Arrowsmith et al. | | 340/506 |
| 6,115,393 A | 9/2000 | Engel et al. | | 370/469 |
| 6,181,776 B1 | 1/2001 | Crossley et al. | | 379/32.01 |
| 6,408,386 B1 | 6/2002 | Hammond et al. | | 712/244 |
| 6,609,128 B1 | 8/2003 | Underwood | | 707/10 |
| 6,697,970 B1* | 2/2004 | Chisholm | | 714/48 |
| 6,947,972 B1* | 9/2005 | Chun | | 709/215 |
| 2002/0099786 A1* | 7/2002 | Chun | | 709/215 |

\* cited by examiner

*Primary Examiner*—Apu M. Mofiz
(74) *Attorney, Agent, or Firm*—Robert E. Bushnell, Esq.

(57) ABSTRACT

The present invention relates to a database table modeling and a event handling method for a real time management to efficiently process the event by mapping each client with an alarm sequence number, and performing a database modeling supporting the mapping with an event management technique, when an alarm and a related event generated in a network equipment are transmitted to alarm managers in real time. According to the present invention, when an alarm event is generated in a network system equipment, an alarm management processor stores such alarm information in an alarm database. The alarm managers poll the alarm information stored in the database by corresponding to the alarm sequence number, and store the polling-related information on a client list table when the polling process is completed. A daemon processor manages a current alarm list of a listener table by mapping a certain amount of current alarm information accumulated on the listener table with a reading alarm sequence number of the client list table, and manages abnormally-completed clients by recognizing a state of the client list table with a last polling time and the alarm sequence number.

25 Claims, 3 Drawing Sheets

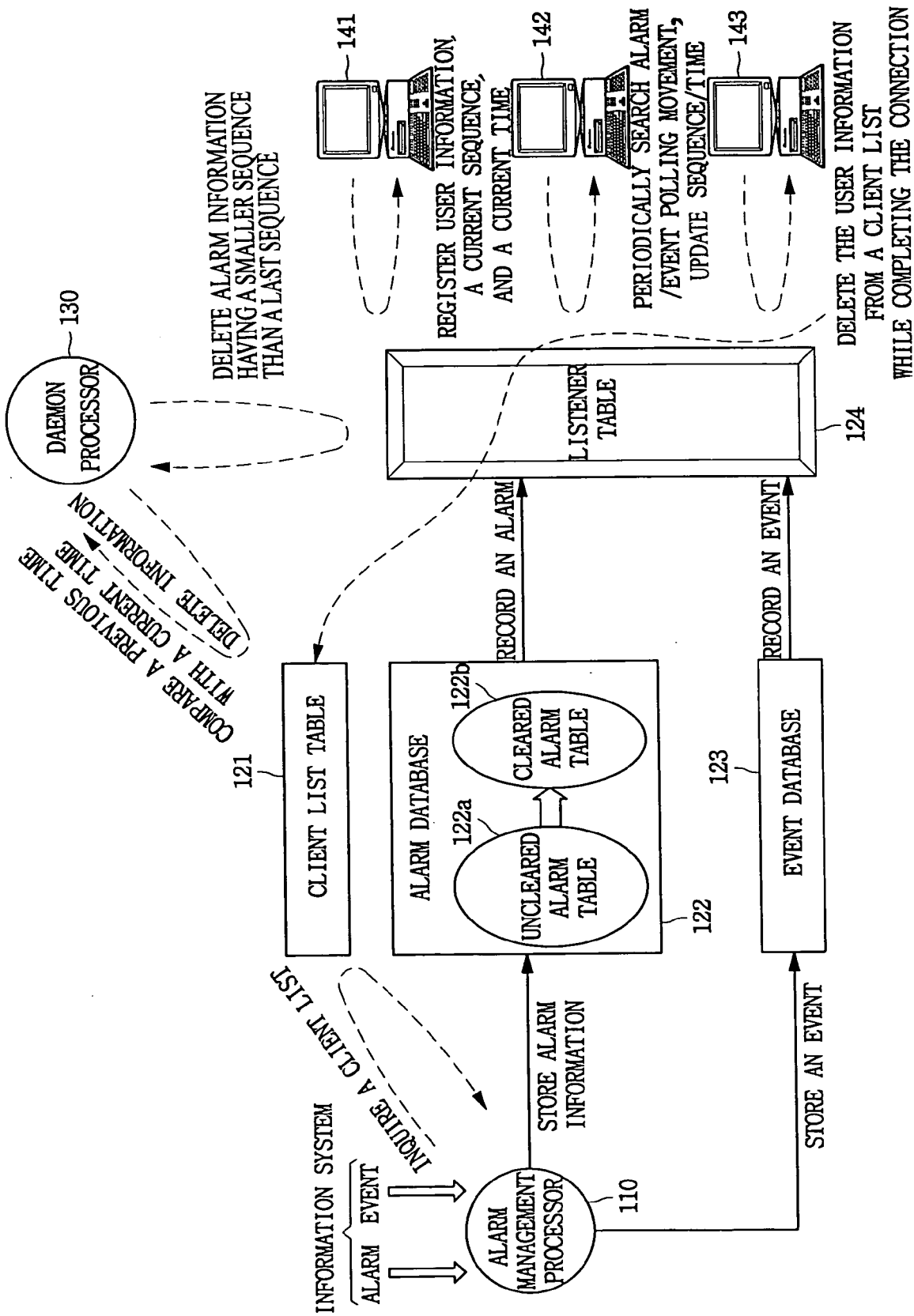

ID_DATABASE TABLE MODELING AND EVENT
HANDLING METHOD FOR REAL TIME
ALARM MANAGEMENT

CLAIM OF PRIORITY

This application makes reference to, incorporates the same herein, and claims all benefits accruing under 35 U.S.C. §119 from an application for METHOD FOR PROCESSING EVENT AND CONTROLLING REAL ERROR AND MODELING DATABASE TABLE earlier filed in the Korean Intellectual Property Office on 14 Feb. 2003 and there duly assigned Serial No. 2003-9519.

BACKGROUND OF INVENTION

1. Field of the Invention

The present invention generally relates to a database table modeling and an event handling method for a real time management, and more specifically, to a database table modeling and an event handling method for a real time management to efficiently process the event by mapping each client with an alarm sequence number, and performing a database modeling supporting the mapping with an event management technique, when an alarm and a related event generated from a network equipment are transmitted to alarm managers in real time.

2. Description of Related Art

Generally, a network management system is used to manage a network connected with many systems. Therefore, the network management system receives and manages state information of each system by being directly or indirectly connected to the systems of the network.

In addition, each operator computer connected to the network management system can confirm the state information.

The systems connected to the network management system are divided into a switching system, a transmission system, etc. The network management system is connected to the switching system and the transmission system, collects alarm data and maintenance data from each system, and manages the collected data in a database.

The network management system maintains an optimal state by always monitoring a state of a communication network, and collects/accumulates states, alarms, and traffic data of a network. Particularly, a network alarm management system stores much alarm information generated in the network, and supplies desirous alarm information to many alarm manager computers linked with the network alarm management system.

A host computer(server) for alarm management is a work station for network management, including an alarm management processor, a broadcasting list table, an alarm database, an event database, a daemon processor, many listener tables, and many alarm managers.

Various state information generated in a network is collected by a management information system based on a computer. The management information system is composed of computer hardware, software, data, procedures, and people, and produces various information by processing data generated in the network.

Alarm and event information informed by the management information system is transmitted to the alarm management processor. The alarm management processor is operated by an alarm management application program, a daemon application program. As known, a daemon is a resident program performing a system operation related work in the background state. That is, a daemon application program for alarm management is automatically driven to carry out necessary works, if there occurs work conditions to be processed in the background state.

The alarm database having a multi distribution table structure includes an uncleared alarm table and a cleared alarm table. The alarm management processor stores alarm information, which is not cleared after being generated in the network, on the uncleared alarm table, and deletes the corresponding alarm information from the uncleared alarm table if an alarm is cleared, then moves to the cleared alarm table to store the alarm information.

Then, a generated event is stored in the event database.

An alarm management server is connected to the alarm managers implemented as an application program operating in a work station or a personal computer, or the alarm management server in order to support distribution alarm management by many operators. If time for reading the alarm information from the uncleared alarm table is not synchronized, some of the alarm managers reading the alarm information at first can read already-cleared alarm information and the rest alarm managers reading the alarm information later can read uncleared alarm information only. In this case, the alarm information of the alarm managers is not equal to each other.

To prevent this problem, the alarm managers have the listener tables, inherent alarm information recognizing spaces. Names of the listener tables are registered on the broadcasting list table. Alarm information generated in the network is stored on the uncleared alarm table, and simultaneously stored on the listener tables corresponding to each of the alarm managers. The alarm managers read the alarm information from each of the corresponding listener tables.

In another words, to process a real time event, alarm managers of earlier art are assigned with tables named listeners in a database generated by a server, when a client drives the alarm managers. The listener tables are generated as many as the number of the driven alarm managers, so as to transmit independent performance results of each alarm manager.

As is generally known, since size and a management range of the network are increasing exponentially, an NMS (Network Management System) managing a high-capacity network is required. So, in order to operate the network management system, it is predicted that a server capable of high-capacity processing will be connected to numerous clients.

However, since a real time alarm processing method of earlier alarm managers has been developed by targeting on a system having a relatively small-sized network, a server has to perform a writing operation on listener tables generated as many as the number of the alarm managers in order to process and transmit alarms to clients. Namely, while processing one event(alarm event), an unnecessary writing operation is carried out as many as the number of events×the number of listener tables.

Thus, an earlier alarm management system increases the number of the listener tables to be processed, as the number of alarm managers of connected clients is increased, thereby reducing an alarm processing speed.

In other words, an earlier alarm processing structure causes a problem that does not satisfy alarm processing performance standards of a high-capacity network management system reflecting a real time function.

SUMMARY OF THE INVENTION

It is therefore an object of the present invention to provide a database table modeling and a event handling method for a real time management to efficiently process the event by mapping each client with an alarm sequence number, and performing a database modeling supporting the mapping with an event management technique, when an alarm and a related event generated in a network equipment are transmitted to alarm managers in real time.

It is another object to improve an alarm information processing speed by a single listener table capable of transmitting generated alarm information to clients with a polling method, a table managing states of connected clients, and monitoring daemon process technique of the polling method managing listener data and a connected client list.

To accomplish the above and other objects, according to one aspect of a database table modeling and a event handling method for a real time management in accordance with the present invention, in the database table modeling and the event handling method for the real time management in a network alarm management system having an alarm management processor, a client list table, an alarm database, a daemon processor managing abnormally-completed clients, a listener table, and many alarm managers, the method includes the steps of: storing alarm information in an alarm database by the alarm management processor, if an alarm event is generated from a network system equipment; polling the alarm information stored in the database according to an alarm sequence number by the alarm managers, and storing polling-related information on the client list table when the polling is completed; and managing a current alarm of the listener table list by mapping a certain amount of current alarm information accumulated on the listener table with a reading alarm sequence number of the client list table by the daemon processor, and managing abnormally-completed clients by recognizing a state of the client list table with a last polling time and the alarm sequence number.

The alarm management processor performs the steps of: properly storing alarm information on an uncleared alarm table and a cleared alarm table of the alarm database, when alarm information arrives from the network system; confirming whether there is a client connected to a client list by searching the client list table; and omitting the alarm storing process performed on the listener table, if there is no client connected to the client list after a confirmed result, and storing the alarm information on the listener table, if there is the client connected to the client list.

Also, the alarm managers perform the steps of: recording self driving time information on the client list table during an initial driving process; being assigned with client IDs (client_id), which are self identifiers, and recording the client IDs on the client list table; reading a self-polled last sequence number(last_seq no) from the client list table, and polling alarm information having a bigger value than the last sequence number among alarm sequence numbers(seq_no) existing on the listener table; recording a polling completion time and the last sequence number(last_sequence number) on the client list table as soon as the polling process is completed; and deleting self information existing on the client list table when the connection is completed.

Furthermore, the daemon processor performs the steps of: periodically monitoring the client list table, and comparing a monitoring time with the last polling time of the client; deleting client information existing in the client list, if a difference between the monitoring time and the last polling time of the client is bigger than a clients polling period or a poling period threshold value after a compared result; searching a minimum alarm sequence number(min(last_seq)) of each client registered on the client list table, and comparing the minimum alarm sequence number with the alarm information stored on the listener table; and deleting alarm information corresponding to an alarm sequence number smaller than the minimum alarm sequence number among the alarm information stored on the listener table, after comparing the minimum alarm sequence number (min (last_seq)) with the alarm information stored on the listener table.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a block diagram illustrating a network alarm management system applied with a database table modeling and an event handling method for a real time management in accordance with the present invention.

DETAILED DESCRIPTION OF THE PREFERRED EMBODIMENTS

Figure 1:
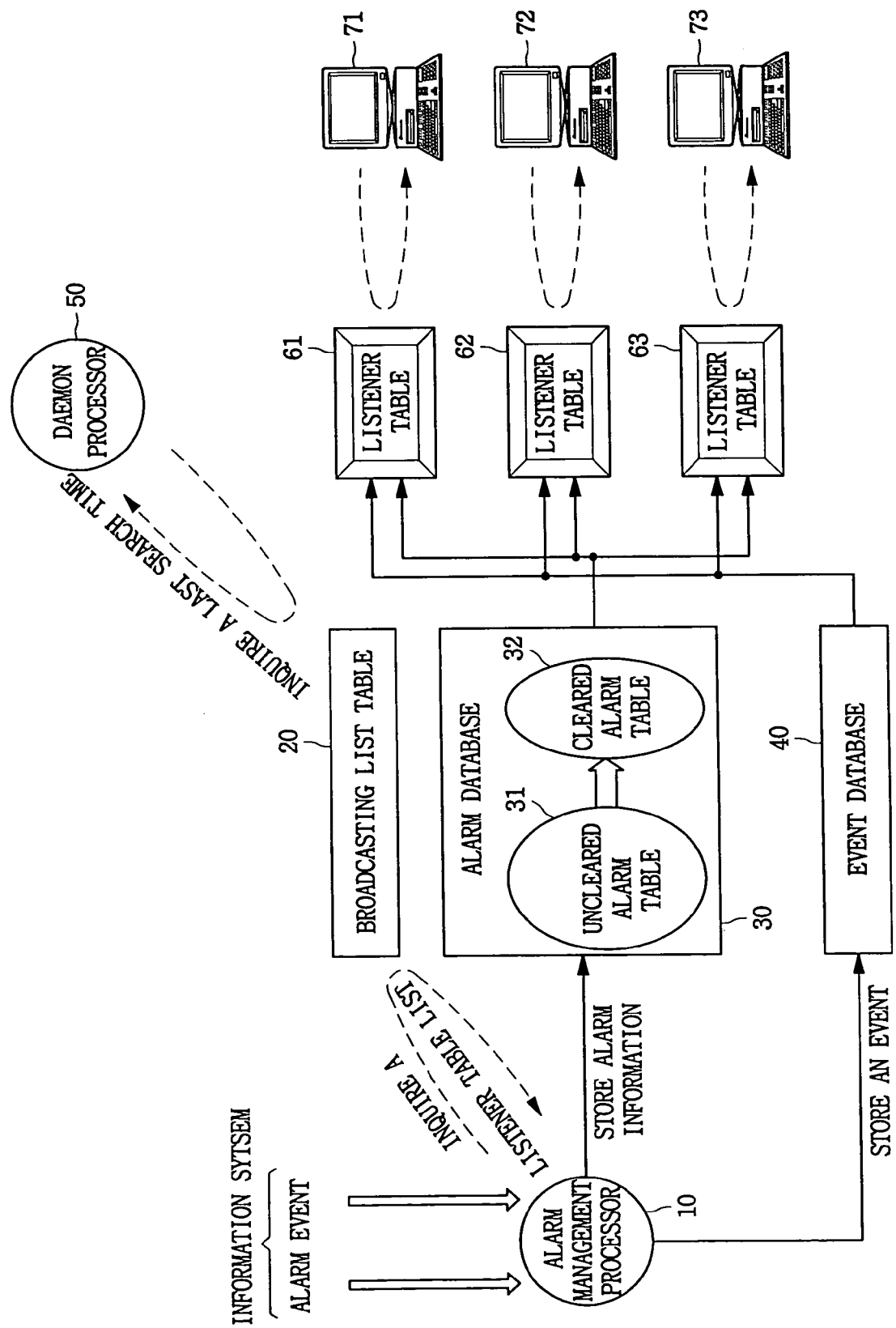
FIG. 1 is a diagram illustrating a block configuration for a network alarm management system in accordance with earlier art.

FIG. 1 is a diagram illustrating a block configuration for a network alarm management system in accordance with earlier art.

Referring to FIG. 1, a host computer(server) for alarm management is a work station for network management, including: an alarm management processor (10); a broadcasting list table (20); an alarm database (30); an event database (40); a daemon processor (50); many listener tables (61~63); and many alarm managers (71~73).

Various state information generated in a network is collected by a management information system(not shown) based on a computer. The management information system is composed of computer hardware, software, data, procedures, and people, and produces various information by processing data generated in the network.

Alarm and event information informed by the management information system is transmitted to the alarm management processor (10). The alarm management processor (10) is operated by an alarm management application program, a daemon application program. As known, a daemon is a resident program performing a system operation related work in background state. That is, a daemon application program for alarm management is automatically driven to carry out necessary works, if there occurs work conditions to be processed in the background state.

The alarm database (30) having a multi distribution table structure includes an uncleared alarm table (31) and a cleared alarm table (32). The alarm management processor (10) stores alarm information, which is not cleared after being generated in the network, on the uncleared alarm table (31), and deletes the corresponding alarm information from the uncleared alarm table (31) if an alarm is cleared, then moves to the cleared alarm table (32) to store the alarm information.

Then, a generated event is stored in the event database (40).

An alarm management server is connected to the alarm managers (71~73) implemented as an application program operating in a work station or a personal computer, or the alarm management server in order to support distribution alarm management by many operators. If time for reading the alarm information from the uncleared alarm table (31) is not synchronized, some of the alarm managers (71~73) reading the alarm information at first can read already-cleared alarm information and the rest alarm managers reading the alarm information later can read uncleared alarm information only. In this case, the alarm information of the alarm managers is not equal to each other.

To prevent this problem, the alarm managers (71~73) have the listener tables (61~63), inherent alarm information recognizing spaces. Names of the listener tables (61~63) are registered on the broadcasting list table (20). Alarm information generated in the network is stored on the uncleared alarm table (31), and simultaneously stored on the listener tables (61~63) corresponding to each of the alarm managers (71~73). The alarm managers (71~73) read the alarm information from each of the corresponding listener tables (61~63).

In another words, to process a real time event, alarm managers of earlier art are assigned with tables named listeners in a database generated by a server, when a client drives the alarm managers. The listener tables are generated as many as the number of the driven alarm managers, so as to transmit independent performance results of each alarm manager.

Figure 2:
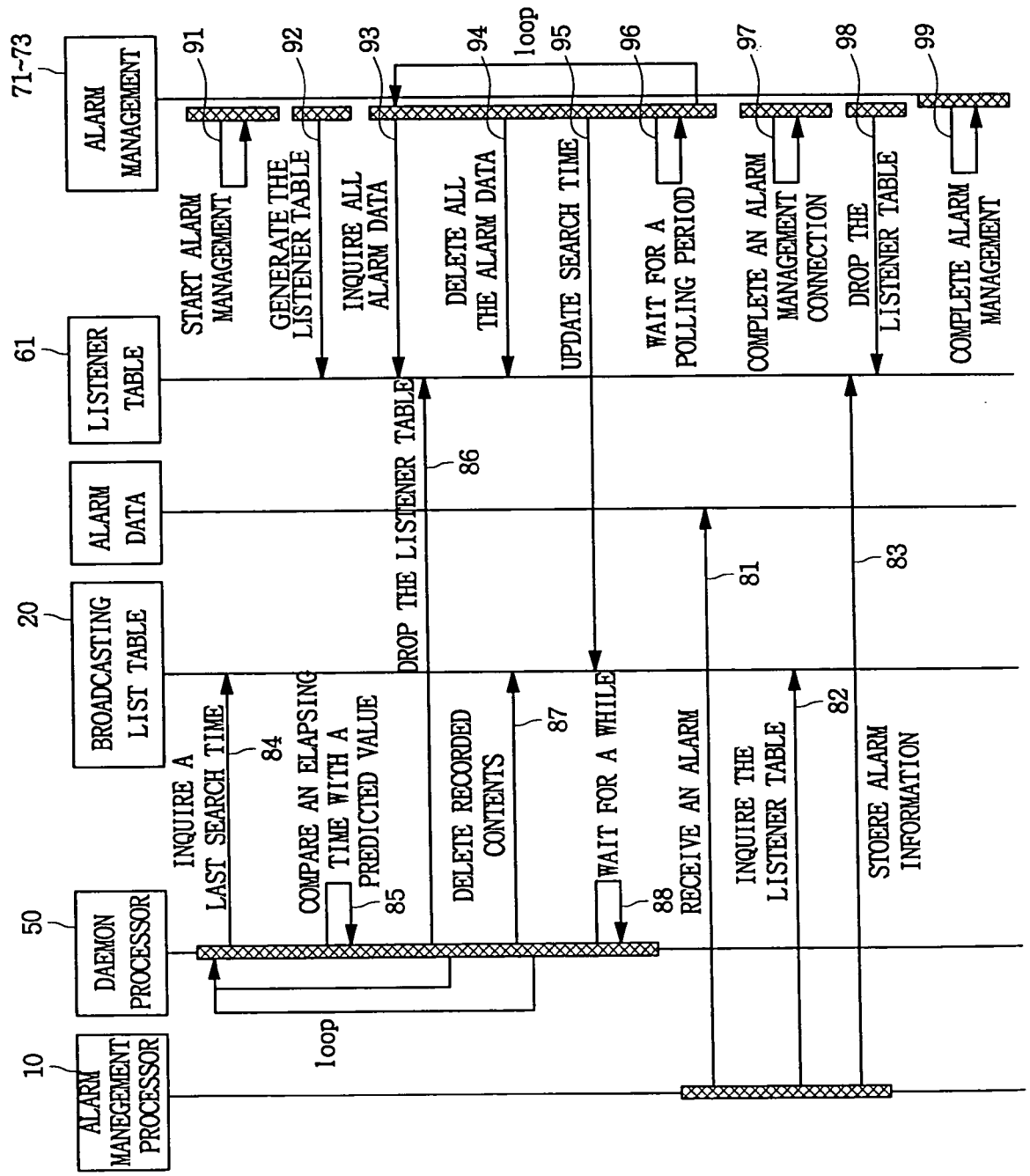
FIG. 2 is a flowchart illustrating an alarm management operation in a network alarm management system in accordance with earlier art.

FIG. 2 is a flowchart illustrating an alarm management operation in a network alarm management system in accordance with earlier art.

Like shown in FIG. 2, when alarm data is inputted to an alarm management processor (10), the alarm management processor (10) performs a determined disposing process for a corresponding alarm (Step 81).

When the alarm disposing process starts, the alarm management processor inquires all listener tables registered and managed on a broadcasting list table (Step 82), and inputs the alarm information on the listener tables for storage (Step 83).

Then, a daemon processor (50) refers to a last search time (Step 84), and compares an elapsing time with a predicted value (Step 85).

The listener tables are dropped (Step 86), and information recorded on the listener tables is deleted (Step 87). Then, the daemon processor (50) waits until next alarm information is generated (Step 88).

Alarm managers (71) start alarm management (Step 91), and generate the listener tables (Step 92).

Then, the alarm managers periodically read information newly stored on selflistener tables by a polling method, and display data read from the listener tables on a real time alarm display window (Step 93).

Then, the alarm managers perform an initializing process by deleting all the real time data of the listener tables in order to execute a next polling operation (Step 94).

The alarm managers update the last search time (Step 95), and wait for a next polling period (Step 96).

If a user completes an alarm management connection (Step 97), the listener tables are dropped (Step 98) and alarm management is completed (Step 99).

As is generally known, since size and a management range of the network are increasing exponentially, an NMS (Network Management System) managing a high-capacity network is required. So, in order to operate the network management system, it is predicted that a server capable of high-capacity processing will be connected to numerous clients.

However, since a real time alarm processing method of earlier alarm managers has been developed by targeting on a system having a relatively small-sized network, a server has to perform a writing operation on listener tables generated as many as the number of the alarm managers in order to process and transmit alarms to clients. Namely, while processing one event(alarm event), an unnecessary writing operation is carried out as many as the number of events×the number of listener tables.

Thus, an earlier alarm management system increases the number of the listener tables to be processed, as the number of alarm managers of connected clients is increased, thereby reducing an alarm processing speed.

In other words, a earlier alarm processing structure causes a problem that does not satisfy alarm processing performance standards of a high-capacity network management system reflecting a real time function.

Reference will now be made in detail to exemplary embodiments of the present invention, which are illustrated in the accompanying drawings.

Hereinafter, the desirable embodiment of the present invention in accordance with the above technical thoughts will be more fully described in reference to the accompanying drawings.

In order to process much generation of alarm events while managing a high-capacity network system, the present invention changes multi-listener table structures into a single listener table structure, and improves an alarm processing speed of an existing management equipment by minimizing a database transaction I/O (Input/Output) process as well as network load. As a result, it advances a real time alarm processing speed required in the high-capacity network management system.

FIG. 3 is a block diagram illustrating a network alarm management system applied with a database table modeling and an event handling method for a real time management in accordance with the present invention.

Referring to FIG. 3, the network alarm management system includes: an alarm management processor (110); databases (121–124) for storing and processing alarm information; a daemon processor (130), a listener server daemon processor managing a current alarm list of a listener table by mapping a certain account of current alarm information accumulated on the listener table with a reading alarm sequence number of a client list, and managing an abnormally-completed client by recognizing a state of the client list with a last polling time and an alarm sequence number; and many alarm managers (141~143).

Here, the databases (121–124) includes: an alarm database (122) composed of an uncleared alarm table (122a) storing alarm information uncleared until now and a cleared alarm table (122b) managing/storing cleared alarm information only; an event database (123) storing and managing event-related information except the alarm information; a listener table (124) performing a polling process of a client alarm manager; and a client list table (121) managing a connected client list.

An operation of a network alarm management system applied with the database table modeling and the event handling method for the real time management by the present invention configured like above will be more fully described as follows.

When an alarm event is generated from a system equipment (management information system), such information is transmitted to the alarm management processor (110) of a server, and the alarm management processor (110) stores the generated alarm information in the alarm database (122).

That is, when the alarm information arrives, the alarm management processor (110) properly stores alarm information on the uncleared alarm table(122a) and the cleared alarm table. (122b) of the alarm database (122), and confirms whether there is a client connected to the client list by searching the client list table (121). If there is no client connected to the client list after a confirmed result, the alarm management processor(110) omits the listener alarm storing process. Unlike this, if there is the client connected to the client list, the alarm management processor (110) stores the alarm information on the listener table(124).

Next, during an initial driving process, the alarm managers (141~143) record self driving time information on the client list table (121), and record assigned client IDs (identifications) on the client list table (121) by being assigned with the client IDs (client_id), which are self identifiers.

Also, the alarm managers (141~143) read a self-polled last sequence number (last_seq no) from the client list table (121), and poll alarm information having a bigger value than the last sequence number among alarm sequence numbers existing on the listener table (124) (select * from listener where seq_no>(select last_seq from client_list where client_id=[my_id]).

Moreover, as soon as completing the polling process, a polling completion time and the last sequence number (last_sequence number) are recorded on the client list table (121).

When the connection is completed, self information existing on the client list table (121) is deleted.

In the meantime, the daemon processor (130) periodically monitors the client list table (121), and compares a monitoring time with a last polling time of a client. At this moment, if a time subtracting the last polling time of the client from the monitoring time is bigger than a clients polling period or a polling period threshold value, client information existing in the client list is deleted.

Also, the daemon processor (130) searches a minimum alarm sequence number (min(last_seq)) of each client registered on the client list table (121), compares the minimum alarm sequence number with the alarm information stored on the listener table (124), and deletes alarm information corresponding to a smaller alarm sequence number than the minimum alarm sequence number among the alarm information stored on the listener table (124).

The present invention can be realized as computer-executable instructions stored in computer-readable media. The computer-readable media includes all possible kinds of recording media in which computer-readable data is stored. The computer-readable media include storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), system memory (read-only memory, random access memory), flash memory, and carrier waves (e.g., transmission via the Internet). Also, the computer-readable media can store and execute computer-readable codes that are distributed in computers connected via a network.

The present invention described so far can easily handle an alarm event by modeling a database table.

Also, it is possible to improve an alarm information processing speed by a single listener table capable of transmitting generated alarm information to clients with a polling method, a table managing states of connected clients, and a monitoring daemon process technique of the polling method managing listener data and a connected client list.

Moreover, it can solve disadvantages of a real time monitoring function of alarm managers, which are rapidly deteriorated in inverse proportion to the increase of connected clients in a high-capacity network management system having a server/client structure for monitoring a real time alarm.

What is claimed is:

1. A database table modeling and an event handling method for a real time management in a network alarm management system including an alarm management processor, a client list table, an alarm database, a daemon processor managing abnormally-completed clients, a listener table, and a plurality of alarm managers, comprising the steps of:

storing alarm information in an alarm database by the alarm management processor, when an alarm event is generated from a network system equipment;

polling the alarm information stored in the database in correspondence to an alarm sequence number by the alarm managers, and storing polling-related information on the client list table when the polling process is completed; and managing a current alarm list of the listener table by mapping a certain amount of current alarm information accumulated on the listener table with a reading alarm sequence number of the client list table by the daemon processor, and managing abnormally-completed clients by recognizing a state of the client list table with a last polling time and the alarm sequence number, said alarm managers performing the steps of:

recording self driving time information on the client list table during an initial driving process; and reading a self-polled last sequence number from the client list table, and polling alarm information including a bigger value than the last sequence number among alarm sequence numbers existing on the listener table.

2. The method of claim 1, wherein the alarm management processor performs the steps of:

properly storing the alarm information on an uncleared alarm table and a cleared alarm table of the alarm database, when the alarm information arrives from the network system;

confirming whether there is a client connected to a client list by searching the client list table; and omitting the alarm storing process performed on the listener table, when there is no client connected to the client list after a confirmed result.

3. The method of claim 1, wherein the alarm management processor further performs a step of storing the alarm information on the listener table, when there is the client connected to the client list.

4. The method of claim 2, wherein the alarm management processor further performs a step of storing the alarm information on the listener table, when there is the client connected to the client list.

5. The method of claim 1, wherein the alarm managers further perform the step of:
being assigned with client identifications, which are self identifiers, and recording the assigned client identifications on the client list table.

6. The method of claim 5, wherein the alarm managers further perform the steps of:
recording a polling completion time and the last sequence number on the client list table as soon as the polling process is completed; and
deleting self information existing on the client list table when the connection is completed.

7. The method of claim 1, wherein the alarm managers further perform the steps of:
recording a polling completion time and the last sequence number on the client list table when the polling process is completed; and
deleting self information existing on the client list table when the connection is completed.

8. The method of claim 1, wherein the daemon processor performs the steps of:
periodically monitoring the client list table, and comparing a monitoring time with a last polling time of a client; and
deleting client information existing in the client list, when a difference between the monitoring time and the last polling time of the client is bigger than a clients polling period or a polling period threshold value after the compared result.

9. The method of claim 8, wherein the daemon processor further performs the steps of:
searching a minimum alarm sequence number of each client registered on the client list table, and comparing the minimum alarm sequence number with the alarm information stored on the listener table; and
deleting alarm information corresponding to a smaller alarm sequence number than the minimum alarm sequence number among the alarm information stored on the listener table, after comparing the minimum alarm sequence number with the alarm information stored on the listener table.

10. The method of claim 1, wherein the daemon processor further performs the steps of:
searching a minimum alarm sequence number of each client registered on the client list table, and comparing the minimum alarm sequence number with the alarm information stored on the listener table; and
deleting alarm information corresponding to a smaller alarm sequence number than the minimum alarm sequence number among the alarm information stored on the listener table, after comparing the minimum alarm sequence number with the alarm information stored on the listener table.

11. A database table modeling and an event handling method for a real time management in a network alarm management system, comprising:
storing alarm information in an alarm database by an alarm management processor, when an alarm event is generated from a network system equipment;
polling the alarm information stored in the database in correspondence to an alarm sequence number by alarm managers, and storing polling-related information on a client list table when the polling process is completed; and
managing a current alarm list of a listener table by mapping a certain amount of current alarm information accumulated on the listener table with a reading alarm sequence number of the client list table by a daemon processor, and managing abnormally-completed clients by recognizing a state of the client list table with a last polling time and the alarm sequence number,
said alarm managers performing the steps of:
recording self driving time information on the client list table during an initial driving process; and
reading a self-polled last sequence number from the client list table, and polling alarm information including a bigger value than the last sequence number among alarm sequence numbers existing on the listener table.

12. The method of claim 11, wherein the act of storing alarm information in the alarm database further comprises:
storing the alarm information on an uncleared alarm table and a cleared alarm table of the alarm database, when the alarm information arrives from the network system; and
confirming whether there is a client connected to a client list by searching the client list table.

13. The method of claim 12, wherein the act of storing alarm information in the alarm database further comprises of omitting the alarm storing process performed on the listener table, when there is no client connected to the client list.

14. The method of claim 13, further comprising of storing the alarm information on the listener table, when there is the client connected to the client list.

15. The method of claim 14, further comprising of:
recording a polling completion time and the last sequence number on the client list table as soon as the polling process is completed; and
deleting self information existing on the client list table.

16. The method of claim 15, further comprising of:
periodically monitoring the client list table; and
comparing a monitoring time with a last polling time of a client.

17. The method of claim 16, further comprising of deleting client information existing in the client list, when a difference between the monitoring time and the last polling time of the client is greater than a clients polling period.

18. The method of claim 16, further comprising of deleting client information existing in the client list, when a difference between the monitoring time and the last polling time of the client is greater than a polling period threshold value.

19. The method of claim 18, further comprising of:
searching a minimum alarm sequence number of each client registered on the client list table, and comparing the minimum alarm sequence number with the alarm information stored on the listener table; and
deleting alarm information corresponding to a smaller alarm sequence number than the minimum alarm sequence number among the alarm information stored on the listener table.

20. The method of claim 12, further comprising of:
searching a minimum alarm sequence number of each client registered on the client list table, and comparing the minimum alarm sequence number with the alarm information stored on the listener table; and
deleting alarm information corresponding to a smaller alarm sequence number than the minimum alarm sequence number among the alarm information stored on the listener table.

21. The method of claim 11, further comprising of storing the alarm information on the listener table, when there is the client connected to the client list.

22. The method of claim 11, further comprising of:
recording self driving time information on the client list table during an initial driving process;
assigning client identifications, the client identifications being self identifiers; and
recording the assigned client identifications on the client list table.

23. The method of claim 22, further comprising of:
reading a self-polled last sequence number from the client list table; and
polling alarm information including a greater value than the last sequence number among alarm sequence numbers existing on the listener table.

24. The method of claim 11, further comprising of:
recording a polling completion time and the last sequence number on the client list table when the polling process is completed; and
deleting self information existing on the client list table when the connection is completed.

25. A computer-readable medium having computer-executable instructions for performing a method, comprising:
storing alarm information in an alarm database by an alarm management processor, when an alarm event is generated from a network system equipment;
polling the alarm information stored in the database in correspondence to an alarm sequence number by alarm managers, and storing polling-related information on a client list table when the polling process is completed; and
managing a current alarm list of a listener table by mapping a certain amount of current alarm information accumulated on the listener table with a reading alarm sequence number of the client list table by a daemon processor, and managing abnormally-completed clients by recognizing a state of the client list table with a last polling time and the alarm sequence number,
said alarm managers performing the steps of:
recording self driving time information on the client list table during an initial driving process; and
reading a self-polled last sequence number from the client list table, and polling alarm information including a bigger value than the last sequence number among alarm sequence numbers existing on the listener table.

* * * * *